United States Patent Office 3,631,079
Patented Dec. 28, 1971

3,631,079
PROCESS FOR THE MANUFACTURE OF CARBOXYLIC ACIDS AND UNSATURATED ESTERS OF CARBOXYLIC ACIDS
Kurt Sennewald and Wilhelm Vogt, Knapsack, near Cologne, Heinz Erpenbach, Surth, near Cologne, and Hermann Glaser, Knapsack, near Cologne, Germany, assignors to Knapsack Aktiengesellschaft, Knapsack, near Cologne, Germany
No Drawing. Filed Mar. 22, 1968, Ser. No. 715,190
Claims priority, application Germany, Apr. 5, 1967, K 61,900
Int. Cl. C07c 67/04; C11c 3/00
U.S. Cl. 260—410                                   5 Claims

ABSTRACT OF THE DISCLOSURE

Production of carboxylic acids (defined as carboxylic acids I) and of unsaturated esters of carboxylic acids (defined as carboxylic acids II), whereby the carboxylic acid II may be identical with the carboxylic acid I, by reacting an olefinic compound in the presence of an aldehyde, which in structure and number of carbon atoms corresponds to the carboxylic acid I, and in the presence of the carboxylic acid II, each of the said olefinic compound, the said aldehyde and the said carboxylic acids containing 2 to 20 carbon atoms, with molecular oxygen or air in the gas phase, at elevated temperature and in contact with a palladium-containing carrier catalyst.

---

It is known that unsaturated esters of carboxylic acids can be produced by reaction of an olefinic compound and and aliphatic or aromatic carboxylic acid with molecular oxygen or air in the gas phase, at elevated temperatures and in contact with a carrier catalyst containing metallic palladium, if desired, in combination with metallic platinum, rhodium, ruthenium, iridium, copper, silver, gold, zinc, cadmium, tin, lead, chromium, molybdenum, tungsten, iron, cobalt or nickel, and in further combination with the alkali metal or alkaline earth metal carboxylate. The carrier materials include silicic acid ($SiO_2$), kieselguhr, silica gel, diatomaceous earth, aluminum oxide, aluminum silicate, aluminum phosphate, pumice, silicon carbide, asbestos or active carbon.

The reaction takes place in accordance with the equation (1) $RCH=CHR' + R''COOH + 0.5 O_2 \rightarrow$
$R''COOCR=CHR' + H_2O$ in which R, R' and R'' stand for hydrogen or aliphatic, cyclo-aliphatic or aromatic radicals containing up to 17 carbon atoms, and is carried out in contact with the above palladium-containing carrier catalysts. For example, the very interesting vinyl acetate can be produced by reaction of ethylene, acetic acid and oxygen.

Some disadvantage, which is associated with conventional processes, resides in the fact that a separate installation is usually needed for the production of the necessary carboxylic acid, e.g. acetic acid, from the aldehyde, e.g. acetaldehyde. In other words, two installations are needed to produce such materials as vinyl acetate, vinyl propionate, vinyl isobutyrate or allyl acetate by the process described above.

Needless to say it would be very advantageous and of considerable commercial interest to have a process enabling the olefin, carboxylic acid and oxygen, for example in the form of air, to be transformed into the unsaturated carboxylic acid ester and the corresponding carboxylic acid to be produced simultaneously from its aldehyde in the gas phase, in a single installation and in contact with one and the same catalyst. In short, it would be exceedingly interesting to produce, for example, vinyl acetate in the gas phase by a reaction such as illustrated by the summation equation:

(2) 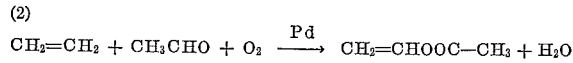
$CH_2=CH_2 + CH_3CHO + O_2 \xrightarrow{Pd} CH_2=CHOOC-CH_3 + H_2O$ In DAS 1,230,009, there is described a process which enables a small quantity of acetaldehyde to be produced from ethylene and air by means of a palladium/active carbon-catalyst suspended in water, the process being carried out under high pressure and at elevated temperature. Acetic acid and the vinyl acetate are obtained in addition to acetaldehyde when manganous acetate is added as a further component to the water. The working examples described therein were carried out discontinuously in the liquid phase.

The desirable reaction illustrated in Equation 2 above has already been described in French Pat. 1,422,241. However the process described therein is also carried out batchwise in the liquid phase at high pressures and temperatures in an autoclave. The catalyst is, for example, a palladium/active carbon-catalyst which is used, for example, in combination with manganese or cobalt acetate. The process definitely calls for the use of a solvent, such as heptane or cyclohexane. In addition to acetic acid, vinyl acetate is produced in yields of up to 46.5%, referred to the acetaldehyde used, the vinyl acetate having been identified by gas-chromatography only.

It has now been found that the quantity of carboxylic acid (acetic acid) needed in accordance with Equation 1 above for the gas phase-production of an unsaturated carboxylic acid ester, particularly vinyl acetate, can be produced partially or completely by using the corresponding aldehyde (acetaldehyde), which is oxidized by means of oxygen also to give carboxylic acid (acetic acid), in contact with the same catalyst. Applied to the production of vinyl acetate, the reaction disclosed in the present invention is believed to take place as shown by the following equations:

(3) 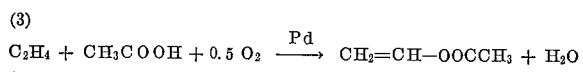
$C_2H_4 + CH_3COOH + 0.5 O_2 \xrightarrow{Pd} CH_2=CH-OOCCH_3 + H_2O$ (4) 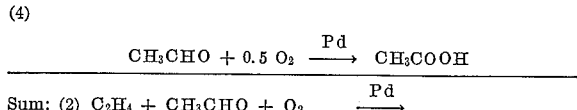
$CH_3CHO + 0.5 O_2 \xrightarrow{Pd} CH_3COOH$

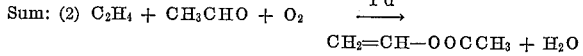
Sum: (2) $C_2H_4 + CH_3CHO + O_2 \xrightarrow{Pd}$
$CH_2=CH-OOCCH_3 + H_2O$ In other words, it is basically possible in accordance with the present invention by the use of acetaldehyde continuously to cycle a given amount of acetic acid. The reason is that the acetic acid needed in accordance with Equation 3 is continuously replaced in accordance with Equation 4, which means in summary that the reaction takes place in accordance with Equation 2. In other words, while deleterious effects upon the catalyst are not likely to occur, it is possible to obtain the aldehyde needed in Equation 4 from a separate installation and convey it together with the olefin, if desired in combination with the carboxylic acid, and oxygen over the catalyst, the aldehyde being oxidized in accordance with Equation 4 to give carboxylic acid, which is obtained in yields higher than 90%. All that is necessary to that effect is to provide for the presence of an always sufficiently high content of oxygen in the gas mixture to undergo reaction in order not to affect productivity and lifetime of the catalyst placed in the reactor. The oxygen content is preferably determined near the reaction outlet where the issuing reaction gas is required still to contain at least 1% by volume oxygen.

A generally applicable mode of executing the present process comprises supplying the olefinic compound to undergo reaction, which has previously been mixed with the aliphatic or aromatic carboxylic acid, to a vaporizer and reacting the resulting mixture in vapor form with oxygen at temperatures between 120 and 250° C., preferably between 150 and 200° C., under pressures between 1 and 20 atmospheres absolute, and in contact with the palladium-containing carrier catalysts described hereinabove. The reaction gas leaving the reactor is cooled to remove condensable matter comprising the carboxylic acid ester formed, unreacted carboxylic acid and water. The condensate, which always contains a certain proportion of aldehydes as further constituents, is worked up by conventional distillation.

By the inventive oxidation of aldehydes to produce the corresponidng carboxylic acids at the same catalyst, it has become possible to utilize the aldehyde obtained upon the distillative work-up, which means that the total process yield can be further increased without any additional expenditure of apparatus. The acetaldehyde recycled to the reactor need not be pure. By the inventive step of recycling crude acetaldehyde to the reactor it is possible to isolate the acetaldehyde from the reaction products with less expenditure of distilling apparatus and partially to produce the carboxylic acid needed in the process inside the same installation. This is a particular cost-reducing factor which enables the whole process to be carried out under commercially more attractive conditions.

The olefinic compounds include those which have 2 to 20 carbon atoms, preferably aliphatic or cycloaliphatic olefins or diolefins, for example ethylene, propylene, butene, butadiene, pentene, dodecene, cyclopentadiene, cyclohexene or cyclohexadiene. The aliphatic or aromatic carboxylic acids, which are used or obtained, include such as have 2 to 20 carbon atoms, for example, acetic acid, propionic acid, butyric acid, isobutyric acid, isovaleric acid, lauric acid, palmitic acid, stearic acid or benzoic acid. The catalysts include those which have been described above. A particularly useful carrier catalyst contains between 0.1 and 6, preferably between 0.5 and 2% by weight palladium, between 0.01 and 10, preferably between 0.1 and 2% by weight gold, and between 0.1 and 20, preferably between 0.5 and 10% by weight of an alkali metal or alkaline earth metal in the form of carboxylates, for example formates or acetates, or in the form of further compounds, for example hydroxides, carbonates, nitrites or phosphates, which form carboxylates under the operating conditions. The carrier catalyst preferably contains between 1 and 60, more preferably between 10 and 50 atom percent gold, referred to the gram atoms palladium plus gold. The carboxylates contained in the catalyst can be comprised of the carboxylates of sodium, potassium, rubidium, cesium, magnesium and/or calcium. Needless to say the alkali metal or alkaline earth metal carboxylates can also comprise the salts of the carboxylic acids used in each particular case. The useful carrier materials have already been identified hereinabove.

In carrying out the process of the present invention it is immaterial whether the aldehyde (acetaldehyde) to be oxidized in accordance with Equation 4 has a number of carbon atoms or a structure different from that of the carboxylic acid (isobutyric acid) used for making the carboxylic acid ester (e.g. vinyl isobutyrate). In this case, the carboxylic acid (acetic acid) obtained by the oxidation in accordance with Equation 4 is contained chiefly in free form in the reaction mixture comprising the carboxylic acid ester (vinyl isobutyrate) and the carboxylic acid (isobutyric acid) in excess, whose ester (vinyl isobutyrate) shall be produced. The carboxylic acid (acetic acid) produced by the aldehyde oxidation can also be transformed into the carboxylic acid ester (vinyl acetate), by recycling it to the reactor. In this case, there is obtained a mixture of various carboxylic acid esters (vinyl isobutyrate and vinyl acetate) which can be used for the production of copolymers, after selection of a determined content of the various carboxylic acid esters in the ester mixture. The simultaneous production of an unsaturated carboxylic acid ester and of a further carboxylic acid by oxidation of aldehyde is also of interest in those cases in which the said further carboxylic acid is found, as a result of its high boiling point, to vaporize with decomposition, which means that its unsaturated ester cannot be prepared in the gas phase. In this event, the ester of the said further carboxylic acid is obtained by subjecting the reaction mixture later to an ester radical interchange.

The present invention relates more particularly to a process for the production of carboxylic acids (referred to hereinafter as carboxylic acids I) and unsaturated esters of caboxylic acids (referred to hereinafter as carboxylic acids II) whereby the carboxylic acid II may be identical with the carboxylic acid I, which comprises reacting an olefinic compound in the presence of an aldehyde, which in structure and number of carbon atoms corresponds to the carboxylic acid I, and in the presence of the carboxylic acid II, each of the said olefinic compound, the said aldehyde and the said carboxylic acids I and II containing 2 to 20 carbon atoms, with molecular oxygen or air in the gas phase, at elevated temperature and in contact with a palladium-containing carrier catalyst.

The gas mixture to undergo reaction is advantageously used in combination with 0.1 to 30% by weight aldehyde, referred to the carboxylic acid II used. Useful aldehydes are acetaldehyde, propionaldehyde, butyraldehyde, isobutyraldehyde, isovaleraldehyde or benzaldehyde.

The reaction gas leaving the reaction zone should conveniently contain at least 1% by volume, preferably 3 to 4% by volume oxygen.

The crude aldehyde obtained during the condensation and distillation of the condensate can also be recycled to the reaction zone.

It is finally advantageous to recycle as cycle gas to the reaction zone the olefinic compound not transformed during the reaction on the carrier catalyst, unreacted oxygen and unreacted carboxylic acid II, which is recovered from the unsaturated ester after conventional condensation and distillative isolation, together with the carboxylic acid I, which is obtained from the aldehyde; ester mixtures being obtained when the acids I and II are not identical.

The following Examples 1, 2, 3 and 5 describe the production of vinyl acetate. Example 1, which is given for the purpose of comparison, describes the conventional preparation of a palladium/gold/potassium acetate/silicic acid-catalyst for the transformation, per hour, of a gas mixture comprised of 500 normal liters (measured at N.T.P.) ethylene, 300 normal liters air and 500 grams acetic acid into vinyl acetate. The acetic acid conversion rate was 21%=104 grams. 396 grams acetic acid were recovered unchanged. The catalyst productivity was 150 grams vinyl acetate per liter of catalyst per hour.

Examples 2 and 3 correspond to Example 1 save that the acetic acid was used in combination with a further 2.5 and 5% acetaldehyde, respectively. Instead of the 396 grams acetic acid recovered in Example 1 there were recovered 411 and 428 grams acetic acid, respectively. The reason is that 16 and 32 grams acetic acid, respectively, had been formed by the oxidation of the acetaldehyde.

By the addition of a relatively large proportion (about 11%) of acetaldehyde, it is possible to initiate the reformation in the process itself of all of the acetic acid transformed, without any need to supply further acetic acid from the outside (cf. Example 5). The catalyst activity could not be found to have been impaired by the additional oxidation of acetaldehyde to acetic acid.

Example 4 corresponds to Example 2 save that the acetic acid was replaced with isobutyric acid which was used in combination with 2.5% acetaldehyde that transformed into acetic acid.

EXAMPLE 1

(Comparative example; production of vinyl acetate without aldehyde addition.)

1 kg. of a ball-shaped (balls 4 mm. wide) silicic acid carrier was mixed and thoroughly impregnated with an aqueous solution containing 8 grams Pd in the form of $PdCl_2$ and 3 grams Au in the form of $H[AuCl_4]$. The mixture was dried with agitation in order uniformly to distribute the noble metal salts on the carrier, and the dry mass was slowly poured into a 4 to 5% hydrazine hydrate solution, at 40° C. Once the reduction of the noble metal compounds was complete, supernatant liquid was poured off, the whole was thoroughly after-washed with distilled water and the catalyst was impregnated, while moist, with an aqueous 15% potassium acetate solution. The solution was decanted and the catalyst mass was dried under reduced pressure, at 60° C. The catalyst so produced contained 0.76% by weight Pd, 0.28% by weight Au and 4.2% by weight K in the form of potassium acetate, and had an apparent density of 0.54 kg./liter. 1000 cc. of the catalyst so made were introduced into an 18/8 chrome-nickel steel tube having an inside diameter of 32 mm., in which was placed a core tube made of the same material and having an outside diameter of 14 mm., intended to receive thermo-resistors for temperature determination, and the catalyst was maintained at 160 to 170° C. by gentle heating of the tube. A gas mixture of 500 normal liters (measured at N.T.P.) ethylene, 300 normal liters air and 500 grams acetic acid was caused, under a pressure of 6 atmospheres absolute, to travel through the tube. The reaction gas leaving the reaction tube was cooled down to 0° C. to remove condensable matter. There were obtained 586 grams of a mixture comprising 67.7% (=396 gram) acetic acid, 25.6% (=150 grams) vinyl acetate, 6.64% water and about 0.2% acetaldehyde. The space/time yield was found to be 150 grams vinyl acetate per liter of catalyst per hour and the yield was about 89%, referred to the 44 normal liters reacted ethylene. The gas mixture (about 735 normal liters per hour) obtained after liquefaction of the condensable matter was found to contain 62% (=456 normal liters) $C_2H_4$, 32.4% $N_2$, 4.2% (=30.9 normal liters) $O_2$ and 1.31% (=9.63 normal liters) $CO_2$. The ethylene conversion rate was 8.8% (=44 normal liters) and the acetic acid conversion rate was 21% (=104 grams). Vinyl acetate was obtained in a yield of 61.2%, referred to the oxygen conversion rate of 50.7%.

EXAMPLE 2

(Production of vinyl acetate with the addition of 2.5% by weight acetaldehyde, referred to the quantity of acetic acid; oxidation of the acetaldehyde to acetic acid.)

500 normal liters/hr. ethylene, 500 grams/hr. acetic acid and 12.5 grams/hr. acetaldehyde were conveyed over the catalyst in the manner described in Example 1. The amount of air was increased to about 330 normal liters/hr. to provide the larger quantity of oxygen needed for the oxidation of the acetaldehyde to acetic acid. The resulting reaction product was worked-up in the manner set forth in Example 1. There were obtained about 600 grams/hr. of a mixture comprising 68.6% (=411 grams) acetic acid, 24.9% (=149.5 grams) vinyl acetate, 6.4% water and about 0.1% acetaldehyde. Calculation based on the acetic acid balance indicated the reformation of about 16 grams fresh acetic acid, resulting from the acetaldehyde oxidation. The yield of acetic acid obtained from the aldehyde, calculated on the above figures, was found to be about 94%. The space/time yield of vinyl acetate which could not be found to have been impaired by the addition of acetaldehyde, was about 150 grams vinyl acetate per liter of catalyst per hour for approximately the same yields and conversion rates of ethylene, acetic acid and oxygen. The acetic acid transformed during the vinyl acetate formation included 15.5% of acetic acid, which had formed during the reaction by the oxidation of the aldehyde.

EXAMPLE 3

(Production of vinyl acetate with the addition of 5% by weight acetaldehyde, referred to the quantity of acetic acid; oxidation of the acetaldehyde to acetic acid.)

500 normal liters/hr. ethylene, 500 grams/hr. acetic acid and 25 grams/hr. acetaldehyde were conveyed over the catalyst in the manner described in Example 1. The quantity of air conveyed over the catalyst was increased to 350 normal liters/hr. There were obtained about 613 grams of a mixture comprising 70% (=428 grams) acetic acid, 23.4% vinyl acetate, 6.45% water and about 0.2% acetaldehyde. The space/time yield was found to be about 145 grams vinyl acetate per liter of catalyst per hour for the same yields and conversion rates of ethylene, acetic acid and oxygen. Calculation based on the acetic acid balance indicated the reformation of 32.1 grams fresh acetic acid, resulting from the acetaldehyde oxidation. The acetic acid transformed included 30.9% of acetic acid which had formed during the process by the oxidation of the aldehyde.

EXAMPLE 4

(Production of vinyl isobutyrate with the addition of 2.5% by weight acetaldehyde, referred to the quantity of isobutyric acid; oxidation of the acetaldehyde to acetic acid.)

500 normal liters/hr. ethylene, 500 grams/hr. isobutyric acid and 300 normal liters/hr. air were conveyed at 170° C. and under a pressure of 6 atmospheres absolute over 1000 cc. of the catalyst the same as that used in Example 1, save that it had been impregnated with potassium isobutyrate. The isobutyric acid was conveyed through the reactor in combination with 2.5% (=12.5 grams/hr.) acetaldehyde. There were obtained about 550 grams/hr. of a mixture comprising 2.9% (=15.95 grams) acetic acid, 14.4% (=79.2 grams) vinyl isobutyrate, 0.2% acetaldehyde, 0.2% vinyl acetate, 2.65% water and 79.5% (=437 grams) isobutyric acid. Calculation based on these figures indicated an acetic acid yield of about 93%, referred to the acetaldehyde used.

EXAMPLE 5

(Production of vinyl acetate with the addition of 11.2% by weight acetaldehyde, referred to the quantity of acetic acid; oxidation of the acetaldehyde to acetic acid.)

A gaseous mixture of 3380 normal liters ethylene
1230 normal liters=3300 grams acetic acid
188 normal liters=370 grams acetaldehyde
350 normal liters oxygen
740 normal liters carbon dioxide was conveyed, per hour, under a pressure of 6 atmospheres absolute and at a temperature of 180 to 200° C., over 4400 cc. of a catalyst prepared in the manner set forth in Example 1, the catalyst containing 0.7% by weight Pd, 0.3% by weight Au and 4.2% by weight K in the form of potassium acetate, deposited on a silicic acid ($SiO_2$)-carrier. The operating conditions used resulted in a sojourn time of 10 seconds and in a velocity of flow of 60 cm./second. To maintain an oxidizing atmosphere, a further quantity of oxygen was supplied near the center portion of the reaction tube, the oxygen being fed at a rate sufficient to prevent the $O_2$-content in the reaction mixture from exceeding 6% by volume near the supply inlet and from falling below 3% by volume in the issuing gas. The resulting condensate (4245 grams/hr.) was found to contain 688 grams vinyl acetate, 3305 grams acttic acid and 217 grams water. Acetic acid was obtained in a yield of 95%, referred to the acetaldehyde used. The catalyst productivity was 156 grams vinyl acetate per liter of catalyst per hour and 110 grams acetic acid per liter of catalyst per hour, from acetaldehyde. Vinyl acetate was obtained in a yield of 90%, referred to the ethylene conversion rate of 6.4%. In view of the fact that 3300 grams/hr. acetic acid were used and that 3305 grams/hr. acetic acid were recovered, it was unnecessary to add further fresh acetic acid in the continuous process.

What is claimed is:

1. In a process for the production of an unsaturated ester of a carboxylic acid by reaction, in a reaction zone, of feed reactants comprising (a) an olefin selected from the group consisting of ethylene, propylene, butene, butadiene, pentene, dodecene, cyclopentadiene, cyclohexene and cyclohexadiene, and (b) a carboxylic acid selected from the group consisting of acetic acid, propionic acid, butyric acid, isobutyric acid, isovaleric acid, lauric acid, palmitic acid, stearic acid and benzoic acid, with molecular oxygen or air in the gas phase, at elevated temperature and in contact with a catalyst containing metallic palladium deposited on a carrier, the improvement which comprises adding to the reactants an aldehyde selected from the group consisting of acetaldehyde, propionaldehyde, butyraldehyde, isobutyraldehyde, isovaleraldehyde and benzaldehyde, oxidizing the said aldehyde in situ to the corresponding carboxylic acid; cooling the reaction gas leaving the reaction zone to remove condensable matter and distilling the condensate to isolate the resulting unsaturated ester; and recycling to the reaction zone unreacted olefin, unreacted oxygen and unreacted carboxylic acid including the carboxylic acid produced from the aldehyde, the catalyst consisting essentially of metallic palladium, metallic gold, an alkali metal or alkaline earth metal carboxylate, or alkali metal or alkaline earth metal compound yielding a carboxylate under the reaction conditions, and a carrier.

2. The process of claim 1, wherein 0.1 to 30% by weight of aldehyde, referred to the carboxylic acid feed reactant, is added to the gas mixture to undergo reaction.

3. The process of claim 1, wherein crude acetaldehyde, obtained on condensation of the reaction gas leaving the reaction zone and distillation of the condensate, is recycled to the reaction zone.

4. The process of claim 1, wherein the rate of feed of molecular oxygen or air to the reaction zone is adjusted to produce a reaction gas leaving the reaction zone which contains at least 1% by volume oxygen.

5. The process of claim 1, wherein the reaction gas leaving the reaction zone contains 3 to 4% by volume oxygen.

References Cited

UNITED STATES PATENTS

| 3,190,912 | 6/1965 | Robinson | 260—497 |
| 3,488,295 | 1/1970 | Sennewald et al. | 260—497 |

FOREIGN PATENTS

| 615,596 | 9/1962 | Belgium | 260—497 |
| 648,814 | 12/1964 | Belgium | 260—497 |
| 1,407,526 | 6/1965 | France | 260—497 |

LORRAINE A. WEINBERGER, Primary Examiner

V. GARNER, Assistant Examiner

U.S. Cl. X.R.

252—430; 260—410.9 N, 476 R, 494, 497 A, 523 A, 530 R, 604 AC